3,551,363
OPEN CELLED SHAPED ARTICLES OF OXYMETHYLENE POLYMERS
Harry Brody, Chester, England, assignor to Celanese Corporation, New York, N.Y., a corporation of Delaware
No Drawing. Continuation of application Ser. No. 474,965, July 26, 1965. This application Dec. 3, 1968, Ser. No. 781,710
Int. Cl. C08d 13/08; C08f 47/08; C08j 1/30
U.S. Cl. 260—2.5                    4 Claims

ABSTRACT OF THE DISCLOSURE

Open-celled shaped articles such as fibers are made of oxymethylene polymer and may have in the tensionless state a crystallinity of at least 20 percent, an open-celled structure in which the entrance passageways of the cells are no larger than about 5000 angstroms as porosimetrically determined by mercury penetration, and an apparent density no greater than about 1.0 gram per cubic centimeter.

CROSS REFERENCE TO RELATED APPLICATION

This application is a continuation of application Ser. No. 474,965, filed July 26, 1965, now abandoned.

This invention is concerned with the improvement of man-made fibers, and more particularly, with the production of stretched fibers having distinctive structural characteristics. In general, stretching and heating operations are employed to produce fibers characterized by a novel open-celled structure in which the cells are small and of a relatively low apparent density.

Man-made fibers having a significant degree of crystallinity or three-dimensional order are well known in the art. These fibers include those made from olefin polymers, e.g. polypropylene and 3-methyl butene-1 polymers, oxymethylene polymers such as trioxane polymers and formaldehyde polymers, polycarbonamides such as polyhexamethyleneadipamide, polyhexamethylene sebacamide, and polycaprolactam, polyesters such as polyethylene terephthalate, and cellulose esters such as cellulose triacetate. These filamentary materials have many and varied uses including the production of yarns for woven and knitted fabrics used in the manufacture of apparel and home furnishings such as carpet and drapes, industrial uses such as tire cord, and various specialized uses such as laminated structures used, for example, in the production of leather substitutes. These conventional fibers generally have a low degree of elasticity and densities which range from about 0.91 for polypropylene up to about 1.4 grams per cubic centimeter for various oxymethylene polymers.

More recently, various methods have been discovered for producing filaments from polymers having some degree of crystallinity, which filaments possess a significant degree of elasticity. These filaments are different in kind from filaments formed of materials such as rubber or spandex which are substantially amorphous in the unstretched state. Processes for the production of elastic filaments from polypropylene and other olefin polymers are disclosed for example in British Pats. 935,809 and 962,231 and a process of making elastic filaments from oxymethylene polymers is disclosed, for example, in application Ser. No. 341,725, (now abandoned) filed Jan. 31, 1964 by Coplan et al. These previously described synthetic filaments have varying degree of elasticity and conventional densities approximating the densities of the polymeric materials from which they are formed. Such fibers are suitable for use in a variety of applications.

Although the known man-made fibers are highly useful, there exist other possible applications for synthetic fibers wherein somewhat different properties would be desirable. For example, fibers having substantially lower apparent densities than those heretofore obtained would be very useful in products requiring a high degree of bulk or cover and relatively low weight, e.g. woven or knitted fabrics for apparel requiring a high degree of insulation from heat or cold, fiber fill applications requiring a high degree of insulation, e.g. in sleeping bags and quilts, and as a general insulation material. Moreover, synthetic fibers of particularly low apparent density have the economic advantage that they may be often used for the same purposes as fibers of conventional densities but with the employment of a much lower weight of material.

In accordance with one aspect of the invention, a novel class of man-made fibers is provided having a significant degree of crystallinity, an open-celled structure with small cells, e.g. smaller than those which can be measured by an optical microscope, and apparent densities significantly lower than the apparent densities of corresponding fibers composed of the same fiber-forming polymer but having substantially no open-celled or other voidy structure ("apparent density" being the weight per unit of "gross volume" of the fibers, where "gross volume" is the product of the measured length of the weighed fibers and the average cross-sectional area of the fibers as calculated on the basis of measurements made with an optical microscope). The term "open-celled structure" signifies that the major portion of the void or pore space of such structure within the geometric confines of the fiber is accessible to the outside geometric surfaces of the fiber.

The fibers in a tensionless state have apparent densities lower than the densities of the polymer materials from which they are formed, usually no greater than 85 percent, and preferably about 50 to 75 percent of the densities of the corresponding polymer materials, and the sizes of the passageways to the void or pore space of the open-celled structure accessible to the outside surfaces of the fiber are under 5000 angstrom units, e.g. 150 to 5000 anstrom units, as porosimetrically determined by mercury penetration, which measurement also determines the volume of such void or pore space. The final crystallinity of these fibers is preferably at least 30 percent, more preferably at least 40 percent and more suitably at least 60 percent, e.g. 60 to 100 percent.

Applicant found that if a man-made fiber having a significant degree of crystallinity and spin orientation and/or elasticity is subjected to a degree of stretch below its breaking point, the ratio of the total gross volume of the stretched fiber to that of the unstretched fiber is significantly greater than one. This is very surprising and totally unexpected since the ratio of total gross volume of a given mass of fiber of an elastic material such as rubber or spandex in the stretched state to that of the fiber in the unstretched state has been found to be substantially one, i.e. there is no increase of total gross volume of these fibers when they are stretched. Moreover when a conventional fiber, e.g. of nylon, polyester or polypropylene, is inelastically streached, i.e. "cold drawn," for the purpose of increasing orientation of the fiber, the ratio of total gross volume of stretched to unstretched material is often less than one, i.e. the apparent density of the stretched fiber is higher than that of the unstretched fiber. Expressed another way, the diameter of an elastic fiber of rubber or spandex, or of an ordinary inelastic fiber which is stretched to increase orientation, decreases on stretch to the extent that the length of the fiber increases so that the total gross volume of the stretched fiber is approximately equal to or less than that of the unstretched fiber. This is in contrast to what occurs when an elastic crystalline fiber contemplated by this invention is stretched. The decrease in the diameter of such a fiber on stretch is either zero or very small and such decrease in diameter does not make up for the length increase on stretch, so that the total gross volume of the stretched fiber is substantially higher than that of the unstretched fiber. As the total gross volume of the fiber being stretched increases, its apparent density decreases proportionately.

Moreover, if the stretching tension on the relatively crystalline elastic fibers as described in the preceding paragraph is released, the gross volumes and apparent densities of the fibers tend to revert back substantially to those of the fibers in the unstretched state. That is to say, the gross volume increase and apparent density decrease are reversible. However, it has been found that, if these fibers are heat treated properly in the stretched state, they may be stabilized so as to maintain their high gross volume and low apparent density characteristics after the stretching tension is removed.

Although it is not intended to limit the scope of this invention by any theory, the distinctive behavior of these relatively crystalline elastic fibers may be explained in terms of the presence of spring-like fibril components disposed somewhat in alignment with the length of the fiber. Although the configuration of these fibril components is surely more complex than that of a coil spring, it is helpful to visualize a coil spring as a model. When a coil spring is extended, its length may be increased without reducing substantially the diameter of the coil as a whole. So also with the spring-like fibril components of these fibers. Stretching of these components is not accompanied by a corresponding reduction in their lateral dimensions, as demonstrated by the fact that the cross-sectional area of the fiber as a whole is not, upon stretching, reduced proportionately to the increase in fiber length. On heat treatment of the distended fibril components, internal stresses tending to return the components to their pre-stretched state are relieved sufficiently to give the components a degree of stability in their distended condition.

The precursor fibers which are subjected to the stretching and heat-setting treatments of the invention generally have a crystallinity of at least 20 percent, preferably at least 40 percent, and most suitably at least 50 percent, e.g., 50 to 90 percent. In addition, such fibers have an elastic recovery from a 25 percent extension of at least 60 percent, the determination of elastic recovery being as hereinafter defined. The fibers generally are fibers that have been spin-oriented, typically by developing high shear forces in the polymer material as it is being solidified at the metier through the use of a high draw down ratio.

In addition to having a percent crystallinity within the foregoing ranges the crystalline portions of the precursor fiber preferably has an average crystallite size of at least 45 angstroms, more suitably about 60 to 500 angstroms.

Before carrying out the stretching and heat setting steps the precursor fiber may advantageously be annealed, e.g. by heating the material at a temperature, for example, between 75° C. and the melting point of the fiber-forming polymer for a period in the range of a fraction of a second to several hours depending on the method of heating, the geometry of the fiber. This has the effect of improving the crystal structure of the precursor fiber, e.g. by increasing the size of the crystallites and removing imperfections.

The stretching of the fibers may be carried out at any temperature below the melting point of the fiber-forming polymer. In most cases but not all, this will be above the glass transition temperature of the polymer. The heat treatment of the fibers in the stretched state should be carried out at a temperature between about 50° C. and the melting point of the fiber. The stretching operation and the heat treatment may be carried out sequentially or they may be combined in a single operation, e.g., by stretching the fiber over a metal surface heated to the required temperature.

The precursor fibers to be subjected to the heat treatment may be extended up to about 90 percent of their breaking elongation at the stretching temperature, preferably within the range from about 25 percent of the unstretched length to about 95 percent of the breaking elongation. The period of heat treatment should be longer than 0.1 second and may be within the range of about 0.5 second to 30 minutes, preferably about 2 seconds to 15 minutes. As may be surmised from the foregoing discussion, the apparent density of the heat treated low density fiber is significantly below that of the precursor fibers.

A significant group of fibers to which this invention may be applied are the olefin polymer fibers, e.g. polypropylene, poly-3-methyl butene-1, poly-4-methyl pentene-1, polyethylene as well as copolymers of propylene, 3-methyl butene-1, 4-methyl pentene-1, or ethylene with each other or with minor amounts of other olefins, e.g. copolymers of propylene and ethylene, copolymers of a major amount of 3-methyl butene-1 and a minor amount of a straight chain n-alkene such as n-octene-1, n-hexene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers are generally formed into filaments and films by melt extrusion.

Elastic polypropylene fibers which may be used as starting materials in this invention are illustrated, for example, in British Pats. 935,809 and 962,231 and United States application Ser. No. 400,751 (now abondoned), filed Oct. 1, 1964. The polypropylene generally has a degree of isotacticity of at least 70 percent measured as the residue after extraction with boiling heptane and the elastic fibers in general have an elastic recovery of at least 60 percent from a 25 percent extension, preferably from 80 to 100 percent from a 50 percent extension. Such elastic fibers also have a crystallinity in the range of about 50 to 100 percent, a density in the range of about 0.85 to 0.93 gram per cubic centimeter, and a tenacity in the range of about 0.8 to 3.0 grams per denier, all of these values being as measured at room temperature.

In general, elastic fibers of polypropylene as described above may be made by first melt spinning the polymer at a fairly high "drawdown" or "spin draw" ratio and then heat treating to anneal the fibers without stretch, i.e. while allowing the material to be free to relax or applying only enough tension to prevent shrinkage. The drawdown ratio used is generally at least 10, preferably at least 50 and may be as high as 4000 or 8000. Polypropylene spun under these conditions generally has a birefringence of about 0.008 to about 0.020.

These fibers are preferably heat treated or annealed without stretch, for example, at a temperature of about 85° C. up to about 160° C., for a period of about 0.1 second to about 2 hours or more depending on the bulk of the sample to obtain an elastic polypropylene material having the properties of elastic recovery as described previously. In general, such elastic polypropylene fibers have a crystallinity of at least 50 percent and a total volume ratio at 100 percent extension, i.e., a ratio of total gross volume on 100 percent extension to a total gross volume in the unextended state, of at least 1.2, usually 1.3 to 1.9. Moreover, the crystalline portions of the polypropylene fiber often have an average crystallite size of at least about 80 angstroms.

The low density filamentary polypropylene material of the invention may be prepared, for example, by stretching the elastic fiber up to 90 percent of its breaking elongation at the temperature of its stretch, preferably 25 percent to 180 percent of its unstretched length, and while it is in such stretched state, heat treating or "annealing" the material at a temperature in the range of from about 80 to 160° C. for a suitable period, usually about 0.5 second to 3 minutes. This heat treatment has the effect of eliminating the stress in the material caused by stretching and results in a geometrically stable fiber having a density in the range of about 0.40 to 0.80 gram per cubic centimeter, a tenacity at 25° C. in the range of about 1.0 to 5.0 grams per denier, and a breaking elongation in the range of about 35 to 300 percent measured under standard conditions, i.e., 23° C. and 65 percent relative humidity.

In addition to polypropylene, another group of preferred olefin polymers suitable for formation into the elastic filamentary materials which may be used as a starting material in this invention are 3-methyl butene-1 and 4-methyl pentene-1 homopolymers and copolymers as previously set out and which are more fully disclosed in French Pat. No. 1,307,181, United States application Ser. No. 399,091, filed Sept. 24, 1964 by Smart et al. and now abandoned United States application Ser. No. 444,860, filed Apr. 1, 1965 by Stuetz, the latter applications assigned to the same assignee as this application.

Another group of elastic fibers contemplated for use under this invention are those formed of acetal polymers, e.g., as disclosed in application Ser. No. 341,725, filed Jan. 31, 1964 by Coplan et al. These fibers have a crystallinity of at least 60 percent, and an elastic recovery from 50 percent extension of at least 80 percent, preferably 80 to 100 percent. Moreover, such fibers generally have an average crystallite size in the crystalline portion of at least about 80 angstroms, a tenacity of at least 1.0, preferably 1.3 to 2.5 grams per denier, a breaking elongation of at least about 55 percent, preferably 75 to 200 percent, an initial modulus of at least about 2, preferably about 5 to 30 grams per denier, and a birefringence of at least about 0.03, e.g. from about 0.04 to 0.08.

While acetal (or oxymethylene) homopolymers are contemplated, the preferred oxymethylene polymer is a "random" oxymethylene copolymer, i.e., one which contains recurring oxymethylene, i.e., —$CH_2O$—, units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. Acetal or oxymethylene polymers are usually formed into shaped articles by melt extrusion.

Elastic fibers of an oxymethylene polymer may be formed by melt spinning a fiber-forming oxymethylene polymer, i.e., extruding the polymer in the form of a melt through the orifices of a spinneret at a shear rate of about 250 to 2500 reciprocal seconds to form filaments which are taken up at a "drawdown" or "spin draw" ratio of at least about 25, e.g., up to about 8000, preferably about 90 to 4000 when the quench temperature is 70° F. The fiber as spun may have elastic properties as described above, and may be formed into a yarn package, or may be subjected to further treatment as described hereinafter before packaging. In any case, the yarn which is packaged for ultimate use will have the elastic properties described above, and will have a total gross volume ratio at 100 percent extension, i.e., a ratio of total gross volume on such extension to a total gross volume in the unextended state, of at least 1.4, preferably 1.5 to 1.9.

In some cases, it is desirable to subject the precursor acetal polymer fiber to an annealing step before the stretching and final heat setting step for the purpose of improving its crystal structure. The annealing step may be carried out, for example, at a temperature of 85° C. to 160° C. for a period of about 0.1 second to 2 hours.

The "sear rate" of extrusion is defined by the expression $$\frac{4\bar{q}}{\pi r 3}$$

where $q$ is the volume rate of extrusion of the molten polymer through each orifice in cc./sec. and $r$ is the radius of the orifice in centimeters. The shear rate is an indication of the shearing force exerted between the molten polymer and the orfice wall as the polymer is being extruded.

The "spin draw" or "drawdown" ratio is the ratio of the velocity of initial fiber take-up to the linear velocity of extrusion of the molten polymer.

Low density fibers of an acetal or oxymethylene polymer contemplated under the invention may be prepared by stretching the elastic material up to about 90 percent of its breaking elongation, preferably to an extension in the range of about 25 percent of its unstretched length up to 90 percent of its breaking elongation at the temperature of stretching, and while it is in such stretched state, heat treating the fiber at a temperature in the range of about 80° C. up to a temperature below the melting point of the polymer for a suitable period, usually about 0.5 second to 10 minutes. As is the case with olefin polymers, this heat treatment has the effect of eliminating the stress in the material caused by stretching and results in a geometrically stable fiber having an apparent density lower than the density of the polymer and preferably in the range of about 0.7 to 1.0 gram per cubic centimeter, a tenacity in the range of about 1.5 to 3.5 grams per denier, and a breaking elongation in the range of about 40 to 150 precent measured under standard conditions, i.e., 23° C. and 65 percent relative humidity.

The low apparent densities of the fibers of this invention are not caused by the presence of relatively large voids in the material. Thus, such low density fibers generally have substantially no voids which are greater than 5000 angstrom units, as porosimetrically determined. Acetal polymer fibers of open-celled structure in which the passageways of the cells leading to the fiber surface are no larger than about 1000 angstroms have been produced.

The heat treatments referred to above may be carried out, for example, in an oven heated to the appropriate temperature. Alternatively, the heat treatments may be applied in a continuous run of the yarn or bundle of filaments. Such heat treatment may be by means of hot fluid, e.g., in a jacketed tube or shroud, by infrared rays, by dielectric heating or by direct contact of the running yarn or bundle with a heated metal surface, preferably curved to make good contact.

For the heat treatment of the material without stretch, the material may be wound on a bobbin under substantially no stress and subjected to heat treatment in that form or the material may be in substantially loose state, e.g., as a skein of continuous filaments, or as a mass of cut staple fibers.

For heat treatment of material in the stretched state, the material may be stretched on a conventional draw frame and rewound on a bobbin and subjected to heat treatment in that form, or the material may be stretched and heat treated in the continuous fashion by means of two sets of driven rolls traveling at different speeds with the material between the rolls passing through a heated tube or over a heated metal surface.

The following examples further illustrate the invention:

EXAMPLE I

A spin oriented elastic isotactic polypropylene fiber is prepared as described in British Pat. 962,231 and United States application Ser. No. 400,751, filed Oct. 1, 1964 using a drawdown ratio of about 15.5 and including an annealing step of the unstretched fiber at 140° C. for one hour. The fiber has a crystallinity of at least about 70 percent, an average crystallite size of at least about 100 angstroms, a density of 0.93 gram per cubic centimeter, a denier per filament of 7.8, a tenacity of 1.5 grams per denier, a breaking elongation of about 160 percent, a modulus of 31 grams per denier and an elastic recovery of about 95 percent from 50 percent extension all measured at 25° C. The fiber is found to be somewhat oriented by X-ray diffraction examination, and has a total gross volume of the fiber at 100 percent extension to that of the unstretched fiber of about 1.75.

The elastic fiber is stretched 180 percent in a conventional drawing apparatus which has a hot shoe disposed between the drawing rolls, using a hot shoe temperature of 110° C., and wound on a bobbin in the stretched state. The stretched fiber is then heat treated at 105° C. for 10 minutes by placing the bobbin of the yarn in an oven at that temperature for that period of time.

The geometrically stable fiber removed from the bobbin is found to have an apparent density in the tensionless state of 0.58 grams per cubic centimeter which is about 62 percent of that of the elastic precursor fiber, and contains an open-celled structure with substantially no passageways to the surfaces of the fiber larger than about 3000 angstrom units as porosimetrically determined by mercury penetration. The percent crystallinity and average crystallite size of this fiber are at least as great as the precursor elastic fiber.

Other properties of this fiber are a tenacity of 2.9 grams per denier, a breaking elongation of 55 percent, and a modulus of 4.7 grams per denier. The fiber has a wool-like hand substantially different from the waxy hand of conventionally melt spun polypropylene yarn.

The reduction of apparent density of the fiber is somewhat reversible as indicated by the fact that when immersed in boiling water for 10 minutes, the fiber shrinks 55 percent, and has an apparent density of 0.89 gram per cubic centimeter. Other properties of this boiled off fiber are a denier per filament of 7.2, a tenacity of 1.6 grams per denier, a breaking elongation of 175 percent and a modulus of 8.0 grams per denier.

EXAMPLE II

The procedure of Example I is repeated except that the hot shoe temperature is 150° C. rather than 110° C. and the oven temperature is also 150° C. rather than 105° C. The resulting fiber has a percent crystallinity and an average crystallite size at least equal to that of the precursor elastic fiber, a density of 0.52 grams per cubic centimeter (56 percent of that of the elastic precursor fiber), a denier per filament of 3.2, a tenacity of 4.0 grams per denier, a breaking elongation of 45 percent and a modulus of 19 grams per denier.

EXAMPLE III

The procedure of Example II is repeated except that the stretching and heat treatment of the elastic fiber is combined in one step by stretching the elastic fiber 190 percent over a hot shoe at 150° C. and winding the fiber up on a bobbin in the stretched state. The fiber has an apparent density in the tensionless state of 0.57 gram per cubic centimeter.

EXAMPLE IV

The procedure of Example III is repeated except that the as spun fiber is annealed at 160° C. for 30 minutes in the unstretched state and stretched 280 percent over a hot block at 150° C. The apparent density of the resulting fiber in the tensionless state is 0.57 gram per cubic centimeter.

EXAMPLE V

An elastic acetal (or oxymethylene) polymer fiber yarn is prepared as described in application Ser. No. 341,725, filed Jan. 31, 1964 by Coplan et al. from a copolymer of trioxane and 2 weight percent based on the polymerizable mixture of ethylene oxide polymerized as described in United States Pat. No. 3,027,352, after-treated to remove unstable groups as described in application Ser. No. 102,096, filed Apr. 11, 1961, now U.S. Pat. 3,174,948, and further stabilized by blending with 0.5 weight percent of 2,2'-methylene bis(4-methyl 6-tertiary butyl phenol) and 0.1 wt. percent of cyanoguanidine based on the weight of the polymer. The yarn is spun using a drawdown ratio of over 50.

The elastic acetal polymer fiber has a crystallinity of at least 70 percent, an average crystallite size of at least about 100 angstroms, an apparent density in the tensionless state of 1.4 grams per cubic centimeter, a denier per filament of 4.1, a tenacity of 1.1 gram per denier, a breaking elongation of 160 percent, a modulus of 25 grams per denier and an elastic recovery of about 80 percent from 50 percent extension, all measured at 25° C. The fiber is found to be somewhat oriented by X-ray diffraction examination and has a total gross volume ratio at 100 percent extension of about 1.65.

The elastic fiber is stretched 80 percent in a conventional draw frame using a hot shoe temperature of 110° C. and wound on a bobbin in the stretched state. The stretched fiber is then heat treated at 105° C. for 10 minutes by placing the bobbin in an oven.

The geometrically stable fiber removed from the bobbin is found to have an apparent density in the tensionless state of 0.8 gram per cubic centimeter (57 percent of that of the elastic precursor yarn), and contains an open-celled structure, with substantially no cells larger than 1000 angstrom units as porosimetrically determined, and has a percent crystallinity and average crystallite size at least as great as that of the precursor elastic yarn.

Other properties of this low density fiber are a tenacity of 1.7 grams per denier, a breaking elongation of 60 percent and a modulus of 9.1 grams per denier.

On immersion in boiling water for 10 minutes, the yarn shrinks 26 percent and has a denier per filament of 4.4, a tenacity of 1.8 grams per denier, a breaking elongation of 75 percent, a modulus of 9.1 grams per denier, and an elastic recovery of about 80 percent from 50 percent extension measured at 20° C.

The term "fiber" as used in this specification includes continuous filaments, staple fibers, yarns made from the latter materials and tows. While the invention has been described primarily in connection with fibers, it may also be applied to other shaped articles such as films which may be treated in an analogous fashion.

The values of tenacity, breaking elongation, modulus, given above are determined in a conventional manner with the use of an Instron Tensile Tester operating at a strain rate of 100 percent/minute. The "initial" modulus as the term is used above is determined by measuring the slope of the stress-strain curve at the point indicated by one percent strain.

The values of elastic recovery given above are also determined with the Instron at a strain rate of 100 percent/minute. After the yarn is extended to the desired strain value, the jaws of the Instron are reversed at the same speed until the distance between them is the same as at the start of the test, i.e., the original gauge length. The jaws are again reversed after two minutes and are stopped as soon as the stress begins to increase from the zero point. The elastic recovery is then calculated as follows:

$$\text{Elastic Recovery} = \frac{\text{Total length when extended} - \text{Final distance between jaws}}{\text{Length added when extended}} \times 100$$

Measurements with the Instron at room temperature 25° C. are carried out in air at 65 percent relative humidity.

The valves of melting point of a polymer as given above are crystalline melting points, i.e. temperatures at which all crystallites in a polymer disappear as indicated by a loss of birefringence when the polymer is examined with a polarizing microscope.

The values of percent crystallinity given above are determined using the procedure described in an article by R. G. Quynn et al. in Journal of Applied Polymer Science, vol. 2, No. 5, pp. 166–173 (1959).

The values of average crystallite size given above are determined as described in chapter 9 of Klug and Alexander, "X-Ray Diffraction Procedure," John Wiley (1954).

The term "porosimetrically determined by mercury penetration" means that the open-celled nature of the structure and the approximate size of the passageways to the surface of the pores or voids making up such structure are determined with a porosimeter as described in an article by R. G. Quynn in the Textile Research Journal, vol. 33, pp. 21 et seq. (1963).

It is to be understood that the foregoing detailed description is given merely by way of illustration and that many variations may be made therein without departing from the spirit of the invention.

I claim:

1. A man-made fiber of oxymethylene polymer, said fiber having in the tensionless state a crystallinity of at least 20 percent, an open-celled structure in which the entrance passageways of the cells are no larger than about 5000 angstroms as porosimetrically determined by mercury penetration, and an apparent density no greater than about 1.0 gram per cubic centimeter.

2. A shaped article of oxymethylene polymer, said shaped article having in the tensionless state a crystallinity of at least 30 percent, an open-celled structure in which the entrance passageways of the cells are no larger than about 5000 angstroms as porosimetrically determined by mercury penetration, and an apparent density no greater than about 1.0 gram per cubic centimeter.

3. A fiber of a copolymer of trioxane and a minor amount of ethylene oxide, said fiber having in the tensionless state a crystallinity of at least 50 percent, an open-celled structure in which the entrance passageways are no larger than about 5000 angstroms as porosimetrically determined by mercury penetration, and an apparent density no greater than about 0.85 gram per cubic centimeter.

4. An oxymethylene polymer fiber having in the tensionless state a crystallinity of at least 50 percent, and an open-celled structure in which the entrance passageways of the cells are no larger than about 5000 angstroms as porosimetrically determined by mercury penetration, and an apparent density no greater than about 1.0 gram per cubic centimeter.

References Cited

UNITED STATES PATENTS

| | | | |
|---|---|---|---|
| 3,215,486 | 11/1965 | Hada et al. | 260—2.5E |
| 3,330,897 | 7/1967 | Tessier | 264—176 |
| 3,347,969 | 10/1967 | Moelter | 264—210 |

MURRAY TILLMAN, Primary Examiner

M. FOELAK, Assistant Examiner

U.S. Cl. X.R.

264—176, 210, 342